Aug. 25, 1936.　　　　H. R. TEAR　　　　2,052,118
MOTOR VEHICLE LIFT
Filed July 11, 1934
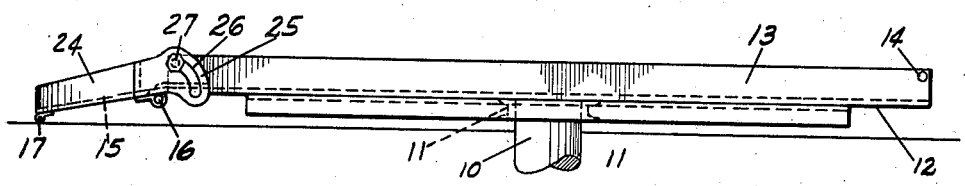
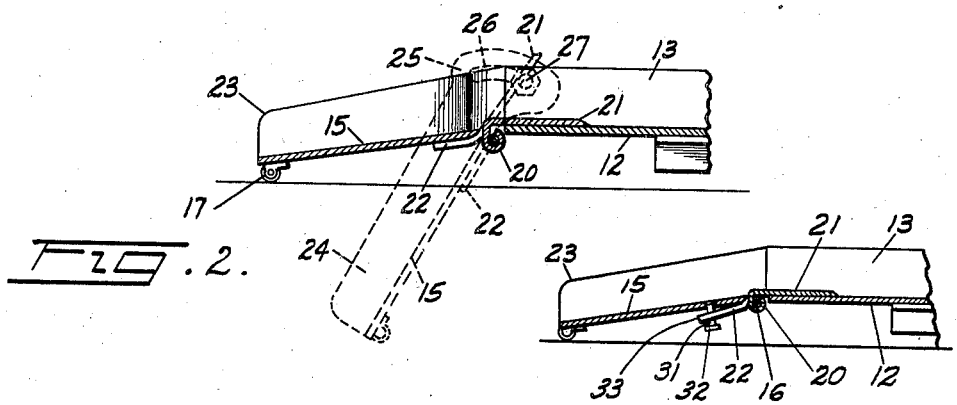
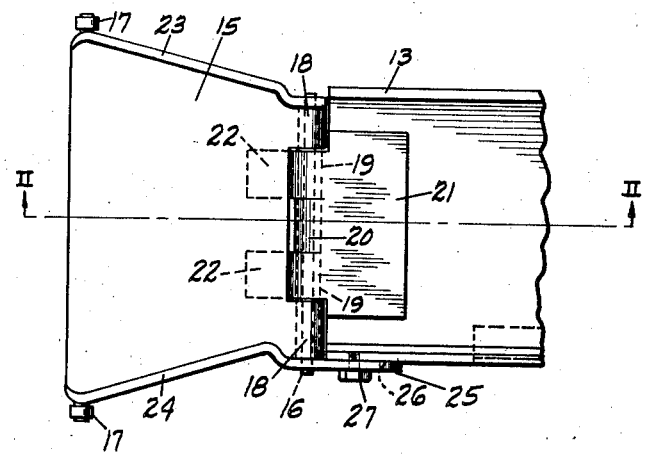
INVENTOR.
HARRY R. TEAR.
BY
ATTORNEY Patented Aug. 25, 1936

2,052,118

UNITED STATES PATENT OFFICE 2,052,118

MOTOR VEHICLE LIFT

Harry R. Tear, Evanston, Ill., assignor to The Lubrication Corporation, Chicago, Ill., a corporation of Delaware Application July 11, 1934, Serial No. 734,590

2 Claims. (Cl. 254—89)

This invention relates to improvements in motor vehicle lifts and more particularly to safety devices or chocks for preventing a vehicle from rolling off the track of the lift during that time which the track is elevated.

This application is a continuation in part of my co-pending application Serial No. 524,069, filed March 20, 1931, entitled "Automobile lift safety devices".

The object of my invention is to provide an improved chock for motor vehicle lifts which is entirely automatic in operation.

A further object is to provide a simple, inexpensive chock as described which will be positive in operation, which will always be in operative position when the lift is raised a short distance from the ground or support, and which will always be in inoperative position when the lift is on the ground.

Other objects, the advantages and uses of the invention, will become apparent after reading the following description and claims and after consideration of the drawing forming a part of this specification.

In accomplishing these objects I utilize a pivoted chocking member associated with the vertically movable track of the lift in such a manner that contact with the ground renders it inoperative and the action of gravity brings it into operative position when the track is raised above the ground.

The invention will be more clearly understood from the following detailed description of embodiments thereof. In the drawing:

Figure 1 is a side elevation of a motor vehicle lift embodying an automatic chock construction in accordance with the invention, Figure 2 is a vertical section taken along the lines II—II of Figure 3, Figure 3 is a top plan view of the chock shown in Figure 1, and Figure 4 is a view similar to Figure 2 of another form of the chock.

This invention is applicable to any type of motor vehicle lift, having a track upon which the vehicle is supported, but by way of example I have shown herein a lift comprising a piston 10 which is adapted to be actuated by fluid pressure in a cylinder (not shown), suitable structural elements, such as steel channels or I-beams 11 for securing the track 12 upon the upper end of piston 10, and reinforcing flanges 13 on both sides of the track 12 to prevent the automobile from lateral displacement when upon the track. At one end of the track I have shown a suitable fixed stop in the form of a rod 14 extending across the track to prevent the automobile from rolling off. An inclined apron or ramp 15 is pivotally mounted upon the other end of the track on a rod 16, the lower end of the apron being engageable with the ground, when the track is lowered, preferably through anti-friction rollers 17.

The pivotal connection between track and apron is best shown in Figures 2 and 3. This connection may comprise projections 18 on the inner end of the apron 15 bent about the pivot rod 16 which is supported by similar projections 19 on the track 12 likewise bent about the pivot rod. A chock plate 21 is pivotally mounted on the rod 16 as by a projection 20 bent about the pivot rod located at the central portion of the plate. The chock plate may be fixed to the ramp 15 in any suitable manner and for this purpose, in the embodiment of Figs. 2 and 3 I have shown projections 22 on the plate welded to the underside of the apron. At the side of the apron or ramp 15 I provide flanges 23 and 24 for reinforcing the apron and for directing the automobile on the track. The flange 24 may be formed with a rearwardly extended portion 25 in which there is a curved slot 26, movable over a stop pin 27 fixed to the track flange 13.

When the lift is in the lowermost position (see Figure 1), the chock plate 21 lies flat upon the track 12 and the stop 27 is at the upper end of the slot 26. As the lift track is elevated the apron 15 may pivot upon the pivot rod 16 (see dotted lines in Figure 2) until the other end of the slot 26 is in registration with the stop pin 27. In this position the chock plate 21 extends upwardly across the end of the track and is held against further pivotal movement so that an automobile upon the track is positively prevented from rolling off. When the lift is lowered, the rollers 17 engage with the ground or support to cause the apron, together with the chock plate, to turn back on the pivot rod 16 to their original positions as shown in Figure 1.

In Fig. 4, I have illustrated another form of the automatic chock which differs from that illustrated in Fig. 2 only as to the relationship between the chock plate 21 and the apron or ramp 15. In the apparatus of Figs. 2 and 3, the plate is illustrated as welded to the lower surface of the apron, whereas, in Fig. 4, I have provided a lost motion connection between the projections 22 on the plate 21, and the apron. This connection may comprise bolts 31, having enlarged heads 32, secured to the underside of the ramp and extending through openings 33 in the projections 22. When the track is in an elevated position the lower surface of the apron 15 will contact directly with the adjacent surface of the projections 22 to cause the plate 21 to move upon its pivotal axis with the ramp as to the dotted line position of Fig. 2. The purpose and advantage of the lost motion connection between apron or ramp and plate is to enable the plate 21 to lie in close engagement with the upper surface of the track 12 and also to permit of the outer end of the ramp contacting with the ground or supporting surface upon which the lift is located. When thrust is applied to the plate 21 in a direction away from the track when the track is elevated, the plate will be held in its chocking position through the instrumentality of the bolts 31, the ends of which may engage with the adjacent portions of the ramp and the bolt 27 engageable with the slot 26 of the apron or ramp flange 24.

While I have described in detail a specific embodiment of my invention it is to be understood that I do not limit myself to such details except as set forth in the following claims:

I claim:

1. In a motor vehicle lift, a vertically movable track upon which a motor vehicle may be supported, and a chock located at one end of the track, said chock including a member secured by a transverse pivot to said end of the track, a stop member fixed against movement relative to said pivoted member and movable therewith about said pivot and extending beyond the pivot in the direction of the longitudinal center of the track, said pivoted member having a mass sufficient to overbalance the mass of said stop member with respect to the axis of said pivot thereby to raise said stop member under the force of gravity as the lift track is raised, said pivoted member having a closed slot therein, and means including a stop pin fixed to said track and slidably received in said slot for engaging said pivoted member at the ends of said slot to limit said pivotal movement.

2. In a motor vehicle lift, a vertically movable track upon which a motor vehicle may be supported, and a chock located at one end of the track, said chock including a member secured by a transverse pivot to said end of the track, a stop member fixed against movement relative to said pivoted member and movable therewith about the pivot and extending beyond the pivot in the direction of the longitudinal center of the track, said pivoted member having a mass sufficient to overbalance the mass of said stop member with respect to the axis of said pivot, a portion of said member lying in a plane substantially at right angles to the member and extending beyond the pivot toward the longitudinal center of the track, said portion lying to one side of the track and having an arcuate closed slot formed therein, and means including a stop pin fixed to said track above the axis of the pivot and slidably received in said slot for engaging the pivoted member at the ends of the slot to limit said pivotal movement.

HARRY R. TEAR.